(12) United States Patent
Martinez

(10) Patent No.: US 9,806,530 B2
(45) Date of Patent: Oct. 31, 2017

(54) LOAD SHARING SYSTEM

(71) Applicant: GRUPO GUASCOR S.L., Olean, NY (US)

(72) Inventor: Jaime Martinez, Zumaia (ES)

(73) Assignee: Grupo Guascor S.L. Unipersonal, Vitoria-Gasteiz (ES)

( * ) Notice: Subject to any disclaimer, the term of this patent is extended or adjusted under 35 U.S.C. 154(b) by 557 days.

(21) Appl. No.: 13/899,748

(22) Filed: May 22, 2013

(65) Prior Publication Data
US 2014/0062199 A1 Mar. 6, 2014

(30) Foreign Application Priority Data

Jun. 7, 2012 (EP) .................................... 12382233

(51) Int. Cl.
*H02J 1/10* (2006.01)
*H02J 3/46* (2006.01)
*H02J 3/00* (2006.01)
*H02J 3/38* (2006.01)

(52) U.S. Cl.
CPC ........ *H02J 3/46* (2013.01); *H02J 3/00* (2013.01); *H02J 3/38* (2013.01); *Y10T 307/555* (2015.04)

(58) Field of Classification Search
CPC ....... H02J 3/00; H02J 3/46; H02J 3/06; Y02E 10/763
See application file for complete search history.

(56) References Cited

U.S. PATENT DOCUMENTS

| 7,804,181 | B2* | 9/2010 | Becker ................... F02D 29/06 290/40 C |
| 2009/0108678 | A1* | 4/2009 | Algrain ................... H02J 3/005 307/87 |
| 2009/0261599 | A1* | 10/2009 | Alston ................ B60L 15/2045 290/40 B |
| 2010/0283435 | A1* | 11/2010 | Bremer ..................... G05F 1/70 323/211 |

(Continued)

*Primary Examiner* — Rexford Barnie
*Assistant Examiner* — Rasem Mourad

(57) ABSTRACT

A load sharing power system is provided including a plurality of generator sets configured to generate an electrical power supply. Each of the plurality of generator sets includes a driver operatively coupled to a drive shaft, such that the driver is configured to impart rotary motion to the drive shaft, and a generator operatively coupled to the drive shaft. The generator is configured to convert the rotary motion of the drive shaft to the electrical power supply. The system further includes a plurality of generator set controllers. Each of the plurality of generator set controllers is operatively coupled to a respective one of the plurality of generator sets. The system also includes a load sharing controller operatively coupled to one or more of the plurality of generator set controllers, and a communication network coupled to the load sharing controller and the plurality of generator set controllers and configured to convey one or more communication signals using an Ethernet Modbus TCP/IP communication protocol from the plurality of generator set controllers to the load sharing controller. The load sharing controller is configured to receive and process the one or more communication signals such that an electric power load coupled to the load sharing power system may be supplied with the electrical power supply.

15 Claims, 2 Drawing Sheets

(56) References Cited

U.S. PATENT DOCUMENTS

| | | | | |
|---|---|---|---|---|
| 2011/0012427 A1* | 1/2011 | Craig | ........................ | H02J 3/14 307/29 |
| 2011/0277456 A1* | 11/2011 | Kidd | ....................... | F03B 13/02 60/327 |
| 2012/0080942 A1* | 4/2012 | Carralero | ................ | H02J 3/383 307/24 |
| 2012/0205986 A1* | 8/2012 | Frampton | ............... | H02J 3/381 307/84 |
| 2013/0214602 A1* | 8/2013 | Frohman | ................... | H02J 3/40 307/52 |

\* cited by examiner

LOAD SHARING SYSTEM

BACKGROUND

This application claims priority to European Patent Application Serial No. 12382233.0, which was filed Jun. 7, 2012. This priority application is hereby incorporated by reference in its entirety into the present application, to the extent that it is not inconsistent with the present application.

Generators may be used to supply an uninterrupted supply of power to an electric power load in many applications. However, it may be impractical or undesirable to use a single generator as an electrical power supply for an electric power load in certain circumstances. For example, a single generator may be incapable of generating a sufficient amount of electrical power to meet the electric power load requirements. Consequently, many power systems include multiple generator sets for supplying electrical power to electric power loads. Such power systems may include generator sets connected in parallel with an electric bus and configured to supply power to the electric bus.

In addition, connecting multiple generator sets in parallel may provide for an inherent redundancy in the power system. Such an inherent redundancy may be desirable in applications requiring uninterrupted supply of electrical power. If a generator set fails, the electric power load may be redistributed to the other generator sets in the power system such that electrical power is maintained in the system. Furthermore, the electric power load in certain applications may vary over time, resulting in an increased demand for electrical power on the system. Power systems having multiple generator sets configured in parallel may be desirable as additional generator sets may be connected in parallel to provide additional electrical power to the increased load. Conversely, if the electric power load decreases, one or more of the generator sets may be removed from the power system and utilized in another power system. Such flexibility in the use of the generator sets may be desirable in the electrical power industry.

Typically, each generator set connected to a load or utility grid includes a controller configured to monitor and control the generator set independently of the other generator sets connected to the load or utility grid. A central controller may be operatively coupled to each generator set controller to provide a central system control for monitoring and controlling one or more of the generator sets in the power system. The central controller may assist in the coordinated operation of the generator sets in the power system, which may save time and resources.

In such a central system control, analog controllers and associated components may be used in the controlling and monitoring of individual generator sets, or the collective set of generator sets, in the power system. Typically, analog controllers include a dual discrete design, such that duplicate input transformers and circuitry may be required when additional features are added. Such added circuitry and components may increase the cost and space required of the system, which may be undesirable in the power system design. In addition, in such a central system control employing analog controllers, the connected generator sets typically are operated in a similar mode, such that operation of two or more generator sets in the system in a different mode is unavailable. Further, in a central system control employing analog controllers, additional components are generally required when operating in a load sharing mode of operation, which increases costs and maintenance requirements of the central system control.

What is needed, then, is a power system including a compact, reliable, and efficient load sharing system having a plurality of generator sets connected in parallel and one or more controllers, configured to monitor and control the load sharing of the power system utilizing a minimum number of controller components.

SUMMARY

Embodiments of the disclosure may provide a load sharing power system. The system may include a plurality of generator sets configured to generate an electrical power supply. Each of the plurality of generator sets includes a driver operatively coupled to a drive shaft, such that the driver is configured to impart rotary motion to the drive shaft, and a generator operatively coupled to the drive shaft. The generator is configured to convert the rotary motion of the drive shaft to the electrical power supply. The system may also include a plurality of generator set controllers. Each of the plurality of generator set controllers is operatively coupled to a respective one of the plurality of generator sets. The system may further include a load sharing controller operatively coupled to one or more of the plurality of generator set controllers, and a communication network coupled to the load sharing controller and the plurality of generator set controllers and configured to convey one or more communication signals using an Ethernet Modbus TCP/IP communication protocol from the plurality of generator set controllers to the load sharing controller. The load sharing controller is configured to receive and process the one or more communication signals such that an electric power load coupled to the load sharing power system may be supplied with the electrical power supply.

Embodiments of the disclosure may further provide a system configured for generating and sharing an electrical power output required by an electric power load. The system may include an electric bus, and at least forty generator sets operatively coupled in parallel to the electric bus. Each of the at least forty generator sets includes a driver configured to transmit mechanical power to a rotary shaft, and a generator configured to receive the mechanical power transmitted from the rotary shaft of the driver and to convert the mechanical energy to at least a portion of the electrical power output. The generator is in electrical communication with the electrical bus. The system also includes at least forty generator set controllers. Each of the at least forty generator set controllers is operatively coupled to a respective one of the at least forty generator sets. The system may further include a load sharing controller operatively coupled to each of the at least forty generator set controllers. The operatively coupled load sharing controller and the at least forty generator set controllers form a communication network configured to monitor and control sharing of the electric power output required by the electric power load.

Embodiments of the disclosure may further provide a method for controlling the generation of an electric power supply by a power generation source for an electric power load. The method may include receiving in a load sharing controller a plurality of first communication signals transmitted from a respective plurality of generator set controllers using an Ethernet communication protocol. The method may also include forming one or more second communication signals in the load sharing controller based on the received plurality of first communication signals, such that each of the one or more second communication signals comprises a respective command and is configured to be transmitted using the Ethernet communication protocol to a respective designated generator set controller of the plurality of generator set controllers. The method may further include transmitting using the Ethernet communication protocol each of the one or more second communication signals to the respective designated generator set controller, such that the respective command of each of the one or more communication signals is received by the respective designated generator set controller. The method may also include processing each of the one or more second communication signals in the respective designated generator set controller, such that the respective command is conveyed using the Ethernet communication protocol to a respective generator set coupled to the respective designated generator set controller, such that the electrical power supply is generated for the electric power load based on each of the respective commands.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
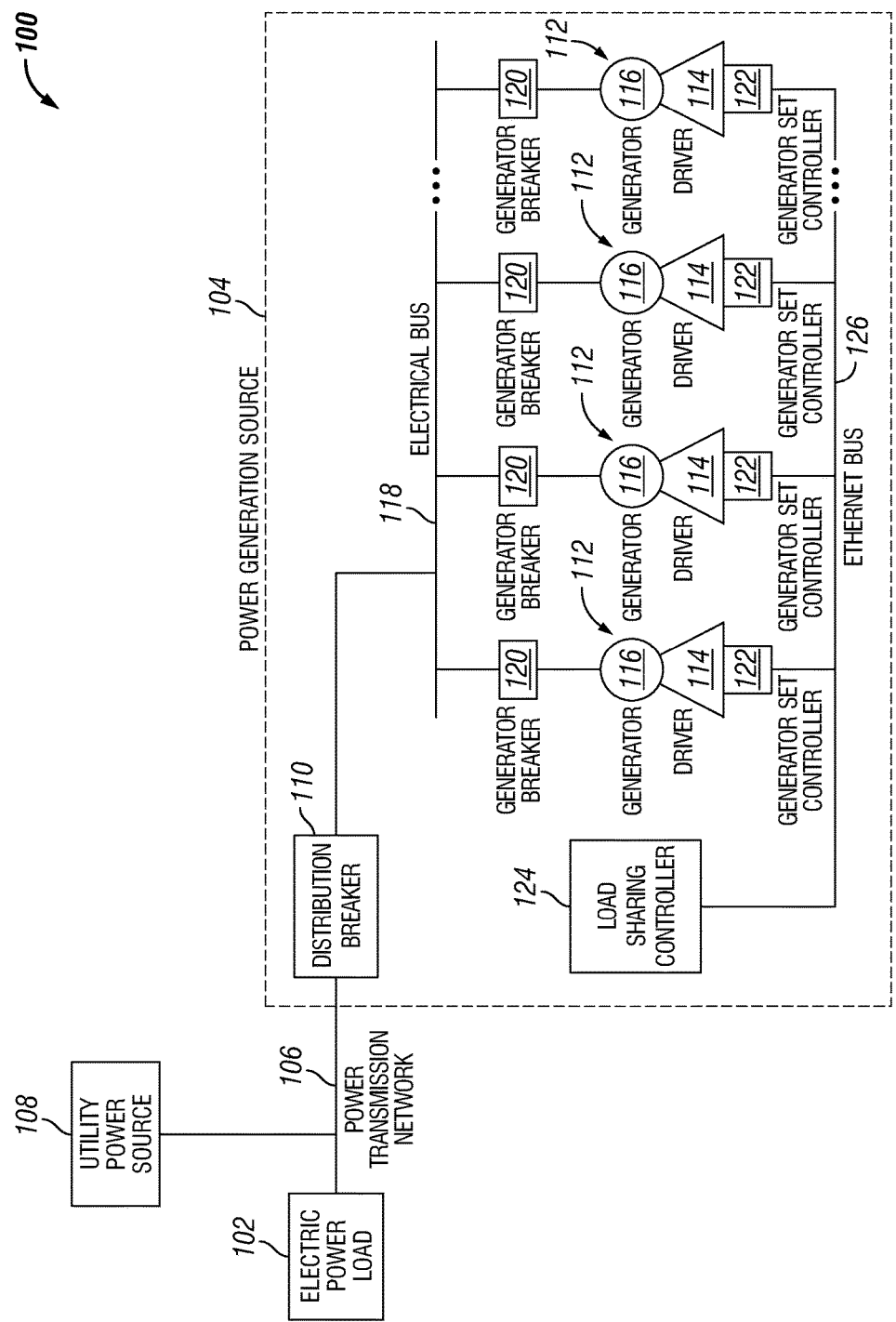
FIG. 1 illustrates a schematic of a load sharing power system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic of a load sharing power system 100 according to an embodiment. The load sharing power system 100 includes a power generation source 104 coupled to an electric power load 102 via a power transmission network 106. A utility power source 108 may also be coupled to the power transmission network 106. The utility power source may be, for example, a commercial electric generation and distribution system providing electricity to residential and commercial end users. In an exemplary embodiment, the utility power source 108 may provide an alternating current (AC) power having a magnitude and power factor, an AC voltage having a magnitude and frequency, and an AC current having a magnitude and frequency.

The electric power load 102 may include any component or components requiring an uninterrupted supply of electrical power. Nonlimiting examples of components requiring an uninterrupted supply of power may include hospitals, police and emergency rescue facilities, airports, computer servers, and industrial manufacturing sites. The electrical power load 102 may include a single, e.g., isolated, component or the electrical power load may include a plurality of components, e.g., a distributed load.

In an exemplary embodiment, the power transmission network 106 is coupled to the power generation source 104 via a distribution breaker 110. The distribution breaker 110 may be a conventional circuit breaker configured to control the connection of the power generation source 104 to the power transmission network 106. The distribution breaker 110 may include a switch (not shown) configured to "trip" or disrupt the flow of electrical power between the power transmission network 106 and the power generation source 104 when a fault or overload is detected in the load sharing power system 100. One of ordinary skill in the art will appreciate that the distribution breaker 110 may be any circuit breaker known in the art capable of regulating the transmission of electrical power between the power transmission network 106 and the power generation source 104.

The power generation source 104 may include a plurality of generator sets 112 operatively connected to each other. In an exemplary embodiment, the plurality of generator sets 112 may be connected in parallel. In an embodiment, the plurality of generator sets 112 includes more than thirty-two generator sets. In another embodiment, the plurality of generator sets 112 includes at least forty generator sets. The number of generator sets 112 may vary and may depend, for example, on the magnitude of the electrical power required by the electric power load 102, the space restrictions of the facility in which the generator sets 112 are disposed, financial considerations, electric bus capacity, breaker short circuit capacity, network broadband capacity, and/or controller configurations, such as processing capabilities, which will be discussed below.

One or more of the generator sets 112 include a driver 114 operatively coupled to a generator 116. In an exemplary embodiment, each generator set 112 includes a driver 114 operatively coupled to the generator 116. The driver 114 may be any device operable to provide mechanical power to the generator 116. Nonlimiting examples of suitable drivers 114 may include diesel engines, gasoline engines, ethylene engines, natural gas engines, other gaseous-fuel-driven engines, gas turbines, steam turbines, wind turbines, hydraulic turbines, wave turbines, or any other sort of engine, turbine, or other driver. In an exemplary embodiment, fuel, such as natural gas or liquid propane vapor, provided to the driver 114 may be compressed and ignited within the cylinders (not shown) thereof so as to generate reciprocating motion of the pistons (not shown) in the driver 114. The reciprocating motion of the pistons may be converted to rotary motion by a crankshaft. The crankshaft (not shown) may be operatively connected to the generator 116 through a shaft (not shown) such that as the crankshaft is rotated by operation of the driver 114, the shaft drives the generator 116.

The generator 116 is operatively coupled to the driver 114 such that the generator 116 receives mechanical power from the driver 114 via the shaft and converts the mechanical power to electrical power. The generator 116 may be any device capable of converting at least a portion of the mechanical power provided by the driver 114 into electricity. Nonlimiting examples of suitable generators 116 include AC synchronous generators, induction generators, permanent magnet generators and switched-reluctance generators. In an exemplary embodiment, the generator 116 generates AC power having a magnitude and power factor and an AC voltage having a magnitude and frequency. The AC power may include an active power and a reactive power. In an embodiment, the generator 116 may generate an AC voltage having a magnitude and frequency and the active power and power factor may be determined by the electric power load. In another embodiment, the generator 116 may generate AC power having an active and reactive power and the AC voltage and frequency may be determined by the electric power load.

In an exemplary embodiment, the generator sets 112 may be coupled to the distribution breaker 110 via an electric bus 118. The electric bus 118 may be configured to transmit electric power generated by the generator sets 112 to the electric power 102 load via the power transmission network 106. The electric bus 118 may include various electrical components operable to transmit electric power generated from the generator sets 112 to the electric power load 102. In an embodiment, closing a generator breaker 120, discussed below, coupled to a generator set 112 may connect the generator set to the electric bus 118. Closing the distribution network, in an embodiment, further provides for the electric bus 118 to transmit the electrical power to the power transmission network 106.

In an exemplary embodiment, each generator set 112 may be electrically coupled to the electric bus 118 via the generator breaker 120. The generator breaker 120 may be a circuit breaker configured to regulate the flow of electricity between the electric bus 118 and the generator set 112. The generator breaker 120 may include a switch (not shown) configured to "trip" or disrupt the flow of electrical power between the bus 118 and the generator set 112 when a fault or overload is detected in the load sharing power system 100. One of ordinary skill in the art will appreciate that the generator breaker 120 may be any circuit breaker known in the art capable of regulating the transmission of electrical power between the generator set 112 and the electric bus 118.

One or more of the generator sets 112 may be coupled to a generator set controller 122. In an exemplary embodiment, each generator set 112 may be coupled to a generator set controller 122. The generator set controller 122 may be configured to monitor and control the operation of one or more aspects of the operation of the driver 114, generator 116, and/or generator breaker 120. In an exemplary embodiment, the generator set controller 122 may be configured to monitor and control the magnitude and power factor of the AC power and the magnitude and frequency of the AC voltage provided by the generator 116. In another embodiment, the generator set controller 122 may be configured to monitor and control peripherals (not shown) of the generator set 112 including cooling devices, pumps, fans, and the like.

In an exemplary embodiment, the generator set controller 122 may be or include one or more programmable logic controllers (PLC). Additionally or instead, the generator set controller 122 may be or include one or more multi-input multi-output (MIMO) digital controllers. The generator set controller 122 may be any digital controller configurable to process signals configured in an Ethernet communications protocol. The generator set controller 122 may include a user interface configured to provide a user with indicators regarding the performance and properties, e.g., AC voltage and power, of the generator set 112 and individual components therein. The user interface may also provide for user input commands associated with the generator set performance. In an embodiment, the user interface may provide a user interface configured to allow the user to manipulate the driver and/or generator performance to affect AC voltage and/or power parameters.

The power generation source 104 may include a load sharing controller 124. The load sharing controller 124 may be operatively coupled to one or more generator set controllers 122. In an exemplary embodiment, the load sharing controller 124 may be operatively coupled to each of the generator set controllers 122. The load sharing controller 124 may be operatively coupled to the distribution breaker 110 and configured to control the connection of the electric bus 118 to the power transmission network 106 and the electric power load 102 such that the flow of electrical power between the electric bus 118 and the power transmission network 106 may be regulated.

The load sharing controller 124 may be operatively coupled to each generator set controller 122 and configured such that the load sharing controller 124 may monitor and control the operation of one or more aspects of the operation of the driver 114, generator 116, and/or generator breaker 120 of the corresponding generator set 112. In an exemplary embodiment, the load sharing controller 124 may be configured to monitor and control at least the magnitude and frequency of the AC voltage and the magnitude and power factor of the AC power provided by each generator 116 in the power generation source 104. In another embodiment, the load sharing controller may be configured to be utilized in a supervisory control and data acquisition (SCADA) system.

In an exemplary embodiment, the load sharing controller 124 may be or include one or more programmable logic controllers (PLC). Additionally or instead, the load sharing controller 124 may be or include one or more multi-input multi-output (MIMO) digital controllers. The load sharing controller 124 may be any digital controller configurable to transmit, receive, and/or process signals configured in an Ethernet communications protocol. In some embodiments, the load sharing controller 124 may be configured from a plurality of digital controllers.

The load sharing controller 124 may include an operator interface through which an operator may communicate with the load sharing controller 124. The operator interface of the load sharing controller 124 may be configured to provide the operator with indicators regarding the performance and properties, e.g., AC voltage and power parameters, of each of the generator sets 112 and individual components therein. The operator interface may be configured to provide the operator with indicators regarding the performance and properties of the electric power load 102 and the performance and properties, e.g., voltage, current, and/or power parameters, of the utility power source 108 and individual components therein.

In an exemplary embodiment, the power generation source 104 may include a communication network, illustrated as an Ethernet bus 126 in FIG. 1, connecting each of the generator set controllers 122 and the load sharing controller 124 in signal communication such that communication signals may be transmitted between the load sharing controller 124 and one or more generator set controllers 122. The Ethernet bus 126 may be configured to convey communication signals using an Ethernet communications protocol. In an exemplary embodiment, the communication network includes a broadband communication network configured to support Ethernet communications protocol. The communication network may be configured to include communication signals transmitted wirelessly.

The communication signals may include information associated with the performance of various components in the power generation source 104. The load sharing controller 124 and/or one or more of the generator set controllers 122 may be operatively coupled to the various components and configured to receive the information via a received communication signal and/or transmit the information via a generated communication signal through the Ethernet bus 126 to a desired operatively coupled controller 122,124. For example, the load sharing controller 124 may receive one or more communication signals including information associated with one or more parameters, e.g., voltage or power, of at least one generator set 112. In addition, the load sharing controller 124 may receive a communication signal associated with information related to the amount of power required by the electric power load 102.

In an exemplary embodiment, the communication signals may be configured using the Ethernet communications protocol. Preferably, the Ethernet communication protocol may be a Modbus TCP/IP protocol. The load sharing controller 124 and each of the generator set controllers 122 may be configured to communicate via the Ethernet bus 126 using the Modbus TCP/IP protocol. Embodiments in which the load sharing controller 124 and each of the generator set controllers 122 may be configured to communicate utilizing other communication protocols are contemplated herein. It will be understood by one of ordinary skill in the art that other communication protocols capable of providing transmission and processing capabilities comparable to the Ethernet communications protocol may be utilized.

Turning now to the operation of the load sharing power system 100, two modes of operation may be presented. In an exemplary embodiment, the power generation source 104 may support an island mode operation. In island mode operation, the utility power source 108 may be disconnected and the distribution breaker 110 is closed, such that the electric bus 118 is connected to the power transmission network 106 and the electric power load 102.

In island mode operation, the load sharing controller 124 receives communication signals via the Ethernet bus 126 including information associated with the magnitude and frequency of the AC voltage generated from each generator set 112. The load sharing controller 124 processes the received communication signals and determines the electrical power needed to be generated by each generator set 112 to meet the power needs of the electric power load 102. The load sharing controller 124 may send communication signals to one or more of the generator set controllers 122 including information associated with power and voltage parameters so that each generator set 112 may output the required electrical power. In an exemplary embodiment, the load sharing controller 124 may send communication signals to one or more of the generator set controllers 122 in response to a change in the electric power load 102 such that the corresponding generator set(s) may modify one or more output parameters to optimize the load sharing power system 100 operating in isochronous mode.

In another embodiment, the load sharing power system 100 may support a grid connected operation. In the grid connected operation, the utility power source 108 may be connected and the distribution breaker 110 may be closed such that the electric bus 118 may transmit electric power generated from the generator sets 112 to the power transmission network 106 and the electric power load 102. The electric power generated from the power generation source 104 may supplement the power generated from the utility power source 108 in an embodiment.

The load sharing controller 124 may receive information associated with one or more characteristics of the utility power source 108 including voltage, current, and/or power of the electricity generated by the utility power source 108. The information received from either or both the utility power source 108 and the electric power load 102 may be received by the load sharing controller 124 and further processed to determine the power output required by each of the generator sets 112. The processed information may be converted into communication signals in the load sharing controller 124 and transmitted to at least one generator set controller 122. The communication signals may include information, for example, associated with the desired power, including the active and reactive power, to be generated by the corresponding generator set 112 and supplied to the electric power load 102. The generator set controller(s) 122 may receive the communication signals and control the corresponding generator set(s) 112 to produce the desired parameters, such as active and reactive power parameters.

In island mode operation or grid connected operation, one or more generator set controllers 122 may receive communication signals differing from at least one other generator set controller 122 of the power generation source 104. The received communication signals may provide for at least one generator set 112 to operate at different parameters from another generator set 112 of the power generation source 104. The parameters may include voltage magnitude and/or frequency and power magnitude including active and reactive power.

Figure 2:
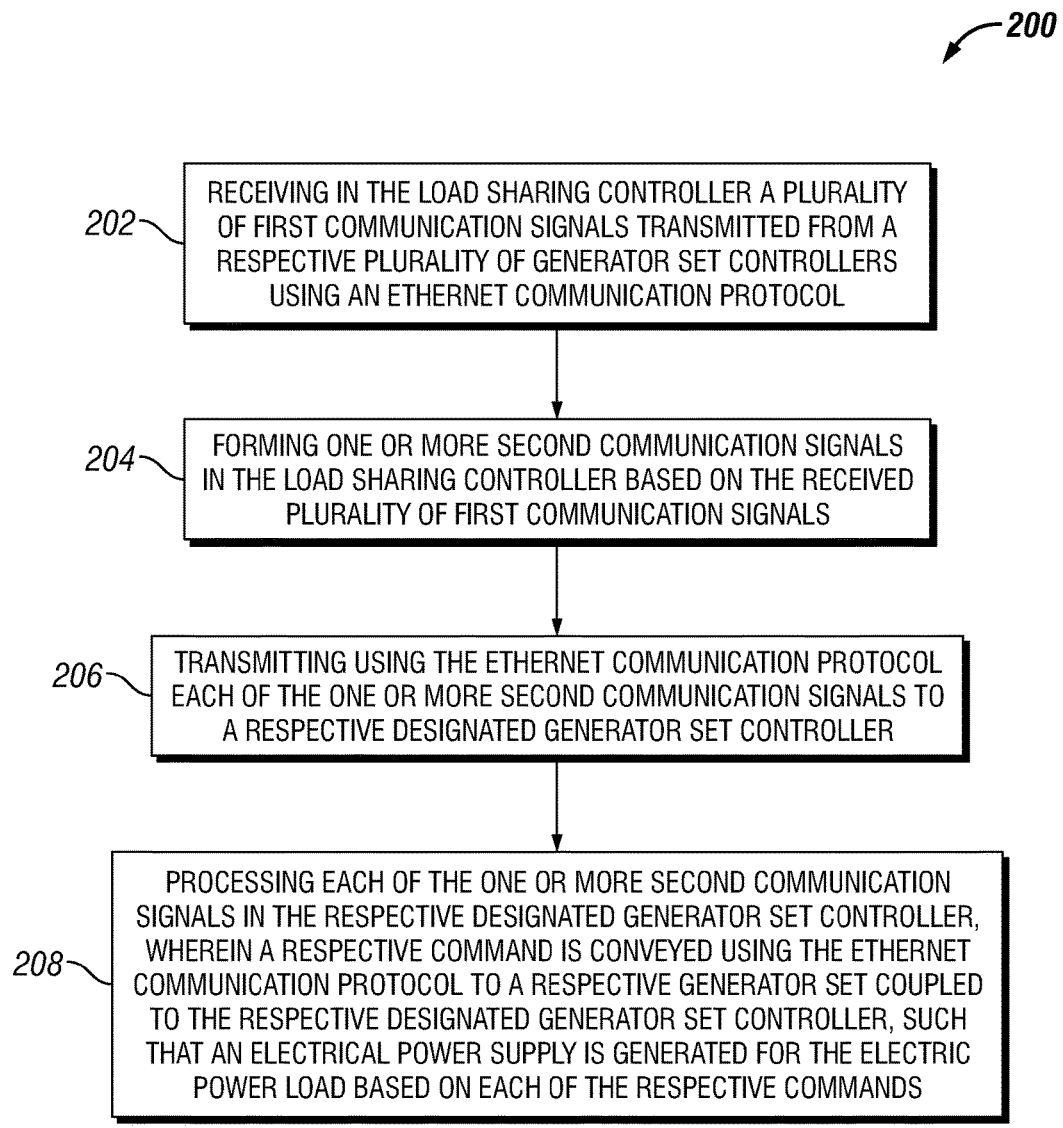
FIG. 2 is a flowchart of a method for controlling an electric power supply generated from a power generation source for an electric power load, according to an embodiment.

FIG. 2 is a flowchart of an exemplary method 200 for controlling the generation of an electric power supply by a power generation source for an electric power load, according to an embodiment. The method 200 includes receiving in the load sharing controller a plurality of first communication signals transmitted from a respective plurality of generator set controllers using an Ethernet communication protocol, as at 202. In an embodiment, the Ethernet communication protocol may be a Modbus TCP/IP communication protocol. In another embodiment, the plurality of generator set controllers includes forty or more generator set controllers.

The method 200 may also include forming one or more second communication signals in the load sharing controller based on the received plurality of first communication signals. Each of the one or more second communication signals includes a respective command and is configured to be transmitted using the Ethernet communication protocol to a respective designated generator set controller of the plurality of generator set controllers, as at 204. In an embodiment, the command may include instructions associated with a modification of one or more performance parameters of the generator set. Such performance parameters may include voltage magnitude and/or frequency. The performance parameters may also include power characteristics such as magnitude and power factor. The method further includes transmitting using the Ethernet communication protocol each of the one or more second communication signals to the respective designated generator set controller, wherein the respective command of each of the one or more communication signals is received by the respective designated generator set controller, as at 206.

The method 200 may also include processing each of the one or more second communication signals in the respective designated generator set controller, wherein the respective command is conveyed using the Ethernet communication protocol to a respective generator set coupled to the respective designated generator set controller, such that the electrical power supply is generated for the electric power load based on each of the respective commands, as at 208.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A load sharing power system, comprising:
   a plurality of generator sets configured to generate an electrical power supply, each of the plurality of generator sets comprising
      a driver coupled to a shaft and configured to impart rotary motion to the shaft; and
      a generator coupled to the shaft and configured to convert the rotary motion of the shaft to the electrical power supply;
   a plurality of generator set controllers, each of the plurality of generator set controllers is coupled to a respective one of the plurality of generator sets and each of the plurality of generator set controllers is configured to directly control one or more voltage and power parameters of each of the driver, a generator breaker, and the generator of the respective one of the plurality of generator sets;
   a load sharing controller coupled to one or more of the plurality of generator set controllers; and
   a communication network coupled to the load sharing controller and the plurality of generator set controllers and configured to convey one or more first communication signals using an Ethernet Modbus TCP/IP communication protocol from the plurality of generator set controllers to the load sharing controller, wherein:
      the load sharing controller is configured to receive and process the one or more first communication signals such that an electric power load coupled to the load sharing power system is supplied with the electrical power supply,
      the load sharing controller is further configured to transmit one or more second communication signals to at least one generator set controller of the plurality of generator set controllers via the communication network, and
      at least one of the one or more second communication signals commands a respective designated generator set controller to operate the respective generator set at a first voltage frequency that is different from a second voltage frequency of the remaining generator sets of the plurality of generator sets,
   wherein the load sharing controller comprises a multi-input multi-output digital controller, and each of the plurality of generator set controllers comprises a multi-input multi-output digital controller.

2. The load sharing power system of claim 1, wherein the plurality of generator sets comprises more than thirty-two generator sets.

3. The load sharing power system of claim 1, wherein the plurality of generator sets comprises at least forty generator sets.

4. The load sharing power system of claim 1, wherein the one or more first communication signals comprises data associated with at least one of the one or more voltage and power parameters of the driver and the generator of the respective one of the plurality of generator sets.

5. The load sharing power system of claim 4, wherein the one or more voltage and/or power parameters comprise a voltage frequency or magnitude or a power frequency or power factor of the generator of the respective one of the plurality of generator sets.

6. The load sharing power system of claim 1, wherein the load sharing controller includes a digital controller.

7. The load sharing power system of claim 1, wherein one or more of the plurality of generator set controllers includes a digital controller.

8. A system configured for generating and sharing an electrical power output required by an electric power load, comprising:
   an electric bus;
   at least forty generator sets coupled in parallel to the electric bus, wherein each of the at least forty generator sets comprises:
      a driver configured to transmit mechanical power to a shaft; and
      a generator configured to receive the mechanical power transmitted from the shaft of the driver and to convert the mechanical energy to at least a portion of the electrical power output, wherein the generator is in electrical communication with the electric bus;
   at least forty generator set controllers, wherein each of the at least forty generator set controllers is coupled to a respective one of the at least forty generator sets and each of the at least forty generator set controllers is configured to directly control one or more voltage and power parameters of each of the driver, a generator breaker, and the generator of the respective one of the at least forty generator sets; and a load sharing controller coupled to each of the at least forty generator set controllers, wherein the coupled load sharing controller and the at least forty generator set controllers form a communication network configured to monitor and control sharing of the electric power output required by the electric power load, wherein the load sharing controller is configured to transmit one or more communication signals to at least one generator set controller of the at least forty generator set controllers via the communication network, and at least one of the one or more communication signals commands a respective designated generator set controller to operate the respective generator set at a first voltage frequency that is different from a second voltage frequency of the remaining generator sets of the at least forty generator sets, wherein the load sharing controller comprises a multi-input multi-output digital controller, and each of the at least forty generator set controllers comprises a multi-input multi-output digital controller.

9. The system of claim 8, wherein the communication network is configured to convey the one or more communication signals using an Ethernet communication protocol.

10. The system of claim 9, wherein the Ethernet communication protocol comprises Modbus TCP/IP communication protocol.

11. The system of claim 8, further comprising at least forty generator breakers, wherein each of the at least forty generator breakers is coupled to a respective one of the generator sets and the electric bus such that each generator breaker is configured to control the flow of electrical power from the respective one of the generator sets to the electric bus.

12. The system of claim 11, further comprising a distribution breaker coupled to the electric bus and configured such that the distribution breaker controls flow of the electrical power output from the electric bus to the electric power load.

13. A method for controlling the generation of an electric power supply by a power generation source for an electric power load, comprising:

receiving in a load sharing controller a plurality of first communication signals transmitted from a respective plurality of generator set controllers using an Ethernet communication protocol, wherein the load sharing controller comprises a multi-input multi-output digital controller, and each of the plurality of generator set controllers comprises a multi-input multi-output digital controller;

forming one or more second communication signals in the load sharing controller based on the received plurality of first communication signals, wherein each of the one or more second communication signals comprises a respective command and is configured to be transmitted using the Ethernet communication protocol to a respective designated generator set controller of the plurality of generator set controllers;

transmitting using the Ethernet communication protocol each of the one or more second communication signals to the respective designated generator set controller, wherein the respective command of each of the one or more second communication signals is received by the respective designated generator set controller and each of the plurality of generator set controllers is configured to directly control one or more voltage and power parameters of each of a respective driver, a respective generator breaker, and a respective generator of a generator set coupled to the respective designated generator set controller, wherein at least one of the one or more second communication signals commands the respective designated generator set controller to operate the respective generator set at a first voltage frequency that is different from a second voltage frequency of the remaining generator sets of the plurality of generator sets; and processing each of the one or more second communication signals in the respective designated generator set controller, wherein the respective command is conveyed using the Ethernet communication protocol to the respective generator set, such that the electrical power supply is generated for the electric power load based on each of the respective commands.

14. The method of claim 13, wherein the Ethernet communication protocol is a Modbus TCP/IP communication protocol.

15. The method of claim 14, wherein the plurality of generator sets comprises at least forty generator sets.

* * * * *